United States Patent
Pawellek et al.

(10) Patent No.: US 6,612,815 B2
(45) Date of Patent: Sep. 2, 2003

(54) ELECTRICALLY POWERED COOLANT PUMP

(75) Inventors: Franz Pawellek, Hafenlohr (DE); Frank Blaurock, Schleusingerneundorf (DE); Peter Amm, Waldau (DE)

(73) Assignee: GPM Gerate-und Pumpenbau GmbH, Merbelsrod (DE)

(*) Notice: Subject to any disclaimer, the term of this patent is extended or adjusted under 35 U.S.C. 154(b) by 0 days.

(21) Appl. No.: 09/947,924

(22) Filed: Sep. 7, 2001

(65) Prior Publication Data

US 2002/0035974 A1 Mar. 28, 2002

(30) Foreign Application Priority Data

Sep. 25, 2000 (DE) .......................................... 100 47 387

(51) Int. Cl.$^7$ ................................................ F04B 17/00
(52) U.S. Cl. .......................................... 417/366; 310/87
(58) Field of Search .............................. 417/223, 366, 417/414, 273; 123/41.44, 41.12; 180/65.5; 310/87, 54; 415/216.1

(56) References Cited

U.S. PATENT DOCUMENTS

| | | | | |
|---|---|---|---|---|
| 4,932,848 A | * | 6/1990 | Christensen | 417/414 |
| 5,127,485 A | * | 7/1992 | Wakuta et al. | 180/65.5 |
| 5,131,818 A | * | 7/1992 | Wittkop et al. | 417/273 |
| 5,134,975 A | * | 8/1992 | Friedrichs | 123/41.12 |
| 5,181,483 A | * | 1/1993 | Ryba | 123/41.12 |
| 5,221,184 A | * | 6/1993 | Gesenhues et al. | 415/216.1 |
| 5,250,863 A | * | 10/1993 | Brandt | 310/54 |
| 6,007,303 A | * | 12/1999 | Schmidt | 417/223 |
| 6,175,173 B1 | * | 1/2001 | Stephan et al. | 310/87 |
| 6,257,177 B1 | * | 7/2001 | Lehmann | 123/41.44 |
| 6,447,270 B1 | * | 9/2002 | Schmidt et al. | 417/366 |

FOREIGN PATENT DOCUMENTS

DE    156978 A  * 10/1985    ........... F04C/19/00

* cited by examiner

Primary Examiner—Teresa Walberg
Assistant Examiner—Leonid Fastovsky
(74) Attorney, Agent, or Firm—Nath & Associates PLLC; Gary M. Nath; Marvin C. Berkowitz

(57) ABSTRACT

An electrically powered coolant pump particularly suited for an internal combustion engine has a pump housing having an elongate shape which encloses a pump wheel on the inlet side and subsequently downstream therefrom encloses an electric motor. An annular flow passage for the coolant is formed between the pump housing and the outside of the electric motor. The electric motor is encapsulated against the coolant, and the structural component of electric motor and pump wheel is retained in the axial range of the electric motor with at least one web in the pump housing through which connections for driving the electric motor are routed. The electric motor is cooled by the coolant flowing by, and may therefore be operated at very high rotational speeds, so that a small structural size and a low weight may be realized. Widely varying installation locations for the coolant pump are therefore possible.

17 Claims, 1 Drawing Sheet

ELECTRICALLY POWERED COOLANT PUMP

Figure 1:
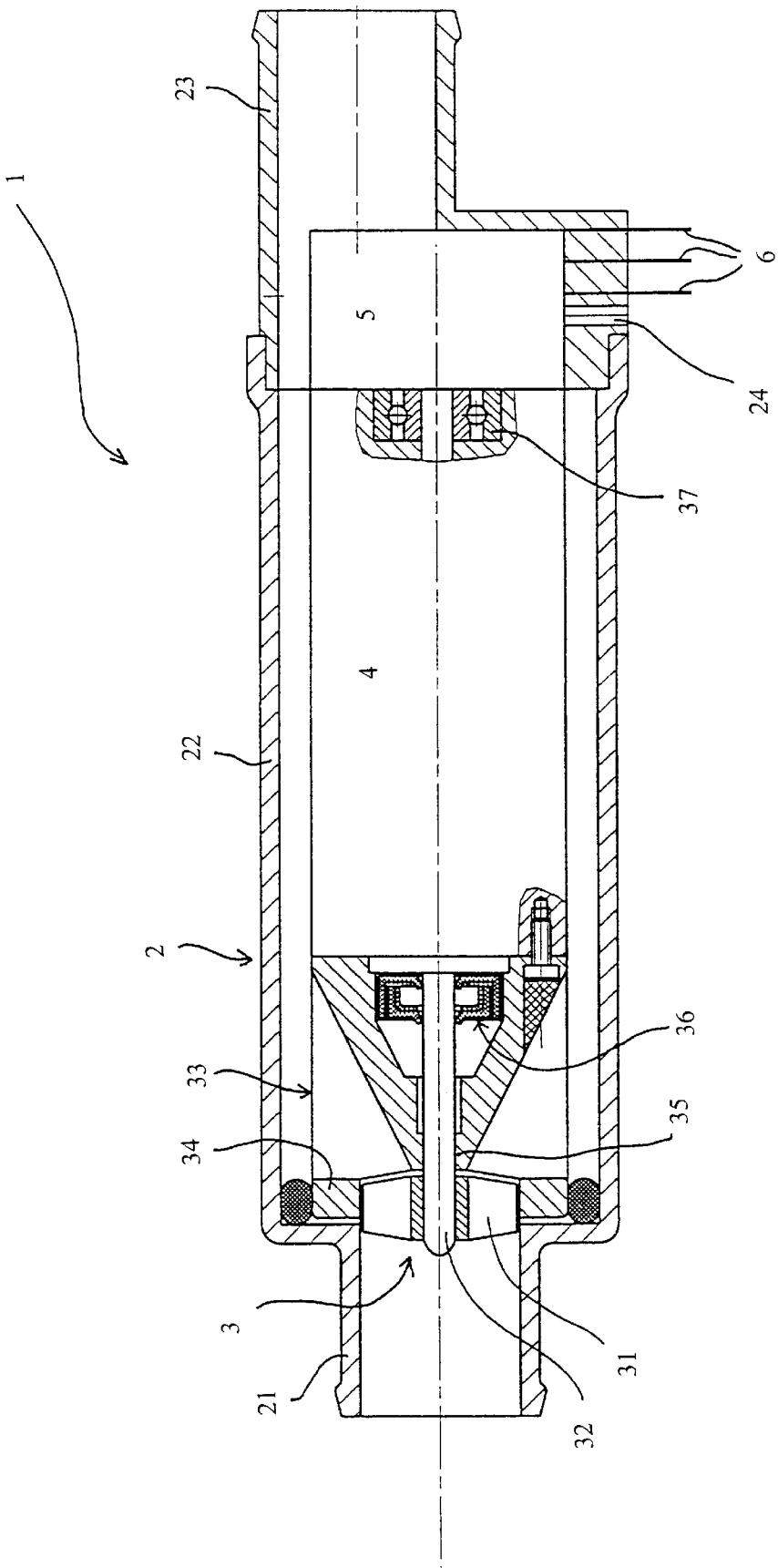

The invention relates to an electrically powered coolant pump in accordance with the preamble of claim 1.

Electrically powered coolant pumps are increasingly employed as drive elements for the cooling water circuit of an internal combustion engine in an automotive vehicle. In comparison with a pump of a conventional construction type which is coupled with the engine speed, these have the advantage of being able to convey cooling water independently of the engine speed and are thus, for example, also capable of conveying at standstill. One example for such a coolant pump is described in DE 296 18 558 U1. This pump has the form of a centrifugal pump whereby the coolant entering in an axial direction is radially deflected into a volute outlet passage and conveyed back into the internal combustion engine. The function of drive mechanism for the impeller of the centrifugal pump is in this example served by an electric motor flange-mounted to the internal combustion engine, which includes a stator and a rotor mounted therein on a hollow shaft. Between the rotor and the stator there is a shroud surrounded by cooling water. The electric motor or the shroud, respectively, is therefore located off the direction of flow of the coolant.

This design of a coolant pump does, however, present drawbacks: Thus the maximum rotational speed of the like wet-rotor pumps is generally limited to approx. 4,500 rpm so as to still be able to keep power losses low, in particular those due to the drag losses which steeply increase with the rotational speed.

In order to nevertheless be capable of providing the desired capacity, these known electrical coolant pumps therefore have correspondingly large dimensions. In addition, for the very reason of its design with a radially acting impeller, this coolant pump requires a considerable structural space so that the coolant may be deflected in a desired manner without excessively high friction losses occurring. The locations suited for installation of a coolant pump of this type are accordingly very limited, particularly in the engine room of an automotive vehicle. Particularly in the case of such an application the comparatively high weight of this design is moreover found to be a drawback, for here any additional weight units have a negative effect on consumption of the internal combustion engine. Traditionally a power-to-weight ratio of, e.g., approx. 1.1 kg/100 W is given.

The invention is therefore based on the object of further developing a coolant pump in accordance with the preamble of claim 1 in such a way that it allows for a high degree of liberty as regards the installation location, at low weight and a smaller demand for structural space.

This object is attained through an electrically powered coolant pump having the features of claim 1.

Thus in accordance with the invention it was particularly provided that the pump housing has an elongate shape and on the inlet side encloses the pump wheel and downstream therefrom encloses the electric motor, with an annular flow passage for the coolant being arranged between the pump housing and the outside of the electric motor, and with the electric motor being encapsulated against the coolant. This has the essential advantage that the coolant flows over the electric motor, as well, and very effective cooling of the electric motor is possible thanks to the large heat exchange area. The electric motor is retained in the pump housing with the aid of at least one web so that it may be driven.

In particular it was recognized in accordance with the invention that the losses of a pump generally increase at the fifth power of the wheel diameter. At the same time, however, the losses only increase at the third power of the rotational speed, for which reason the electric pump of the invention is designed so as to predominantly derive its power from rotational speed, i.e., it aims for higher rotational speeds than the prior art.

Other than in the prior art where the theoretical maximum rotational speed of the utilized pumps cannot be exploited for the named reasons, in accordance with the invention the entire performance spectrum of the electric motor can be utilized thanks to its arrangement in the coolant flow. Where maximum rotational speeds of approx . . . 4,500 rpm were still attainable in the prior art, rotational speeds of more than 12,000 rpm and in particular 15,000 rpm may for the first time also be attained with the electric pump of the invention.

The permanent water cooling of the electric motor's coil jacket obtained in accordance with the invention, and thus carrying off the heat losses of the electric motor through the steady flow of the coolant over the external shell of the motor, permits to obtain an optimized degree of usefulness. As a result, very high performances may be attained with a relatively small-sized motor.

This increased efficiency in comparison with the prior art moreover brings about a drastic improvement of the power-to-weight ratio to, e.g., approximately 350 g/100 W, which has a particularly advantageous effect with regard to the weight of the assembly.

At the same time, the electric motor as well as an optionally associated electronic control circuitry may be provided at very low cost.

On account of the high rotational speeds that are possible, the diameter of the pump wheel may moreover be kept small, so that the resulting losses may be reduced. At the same time this also allows for a substantially smaller size of the coolant pump of the invention in comparison with the prior art, thus expanding the possibilities of installation in an engine room etc. As the pump according to the invention moreover is designed as a so-called "inline pump", it may particularly well be integrated into cooling circuits and is of extraordinarily universal use.

Although fuel delivery pumps in the form of "inline pumps" are also known in the field of automotive vehicles, in these the fuel flows through the magnet gap over the commutator of the electric motor, which makes them wet-rotor pumps. The maximum rotational speed of the electric motor is limited in fuel delivery pumps of this type because the drag losses strongly increase at elevated rotational speeds. These known fuel delivery pumps are designed with a view to applying high pressures on the fuel at relatively low rotational speeds. A dry-rotor motor may not enter into consideration here, for possibly occurring leakages into the hot rotor cavity might result in explosion.

In contrast, the present invention provides to furnish a coolant pump whereby large flow quantities may be conveyed at high rotational speeds, something that is not possible with the known fuel delivery pumps.

Advantageous developments of the invention result from the features of the subclaims.

Thus the electric motor may be followed downstream by an electronic control unit for driving the electric motor. As a result, it is advantageously possible to also obtain—besides a very compact design—permanent cooling of the electronic control unit through the coolant flowing past. The capacity of the coolant pump in accordance with the invention may therefore be further increased while the required installation space is decreased.

It is moreover also possible for the electronic control unit to include a metallic support member, the particularly good heat conductivity of which permits good discharge of the heat energy generated by the electronic components into the coolant.

It is furthermore advantageous if the pump wheel is an axial pump wheel. These allow for particularly high rotational speeds, so that the actual capacity of the electric motor, cooled by the coolant flowing through it in accordance with the invention, may be utilized particularly well.

As an alternative it is also possible for the pump wheel to be designed as a semiaxial pump wheel which is advantageous in particular applications, for example when it is necessary to overcome greater pumping heads.

If the external diameter of the pump wheel substantially corresponds to the internal diameter of a supply conduit to the pump housing, a smallest possible impeller diameter may be achieved. This makes particularly advantageous use of the high rotational speeds of the pump wheel, whereby high flow rates are made possible even at such small cross-sections of flow. At the same time an extremely small size may be obtained for the coolant pump according to the invention.

It is of further advantage if the cross-sectional area of flow of the annular flow passage around the electric motor is adapted to the cross-sectional area of the flow inlet opening, for in this way friction or pressure losses within the coolant pump may be kept minimum. Hereby even better efficiency of the assembly may be attained.

If the first bearing of a shaft supporting the pump wheel is arranged in the vicinity of the pump wheel, the latter may be mounted particularly well with a view to the high rotational speeds, so that the dynamic loads at the pump wheel are low. Moreover the first bearing may therefore also be designed to have relatively small dimensions, which reduces friction losses and increases the overall efficiency of the coolant pump.

Herein the first bearing may in particular have the form of a slide bearing, which has the result of very reliable and durable mounting even if this bearing is arranged within the coolant.

As an alternative it is also possible for the first bearing to have the form of a rolling bearing, whereby particularly low friction may be achieved at this bearing. Sealing of this rolling bearing against the coolant may, for example, be achieved by means of a shaft seal ring or the like.

It is of particular advantage if the first bearing has a geometrical relation with the impeller housing. Through the possibility of processing bearing diameter and housing diameter in a chucking fixture, a minimum "air" gap at the impeller external diameter of, e.g., approx. 0.02 mm may be adjusted.

Moreover a second bearing of a shaft supporting the pump wheel may be arranged on the electric motor, whereby—besides a compact design—a reliable support against the dynamic loads owing to the pump wheel may be achieved.

The second bearing may have the form of a rolling bearing and be encapsulated against the coolant, whereby mounting is particularly reliable even at the aspired high rotational speeds and low friction losses may be achieved. A detrimental influence of the coolant on the bearing by is moreover effectively precluded by its encapsulation against the coolant, which has a positive effect on the life time of the bearing. As a rolling bearing, in particular a deep groove ball bearing may be used which is also suited for receiving axial forces.

It is of further advantage if the second bearing is encapsulated against the coolant by means of a shaft seal ring. Such shaft seal rings have variously also been found under practical conditions to be very reliable even at high rotational speeds. It is therefore possible to revert to time-tested and economic measures for encapsulation of the second bearing.

The shaft may moreover be formed in two parts and comprise a corrosion-proof needle pin and a shaft portion, wherein the needle pin serves as a sliding partner for the shaft seal ring and is press-fitted into the shaft portion, and wherein the needle pin consists of a material that has a higher hardness than the material of the shaft portion. Through the combination of a hard material for the needle pin and a softer material for the shaft portion, a reliable and durable combination of these shaft components may be obtained. In addition the material properties at a respective shaft portion may individually be adapted to the respective sliding partner. Hereby the reliability and functionality of the coolant pump in accordance with the invention may be further improved.

If the at least one web is formed of an elastomer synthetic material, acoustic decoupling of the electric motor from the pump housing may be achieved, which contributes to noise attenuation. At the same time an improved thermal insulation against the pump housing is achieved.

The structural component of electric motor and pump wheel may moreover be retained in the pump housing by a plurality of webs distributed over the circumference, resulting in a very reliable and compact design for the coolant pump.

It is moreover an advantage if the pump wheel is formed of a flexible and impact resistant synthetic material as this permits elastic yielding of the pump wheel in the event of particles being present in the pump wheel gap. Blocking of the pump wheel may thus be avoided even more reliably. In practical testing PEEK was for example found to be a particularly suitable material.

As an alternative, or in addition, the supply conduit to the pump housing which encloses the pump wheel may also be formed of a synthetic material which is capable of embedding particles to thus prevent blocking of the pump wheel. For this purpose preferably a relatively soft synthetic material is used, so that the particles may retreat into it and damage to the pump wheel will not occur.

Hereinbelow, the invention shall be explained in more detail by way of embodiments while referring to a figure of the drawing which shows a longitudinal sectional view of a coolant pump in accordance with the invention.

In accordance with the representation in FIG. 1, an electrically powered coolant pump 1 includes an elongate pump housing 2 which encloses a pump wheel assembly 3, an electric motor 4 and an electronic control unit 5.

The pump housing 2 comprises a flow inlet opening 21, a center portion 22 and a flow outlet opening 23. The coolant pump 1 in this embodiment is integrated into a closed cooling circuit of an automotive vehicle, wherein the flow inlet opening 21 is coupled with a supply conduit—not shown—in the form of a tube or the like, and the flow outlet opening 23 is coupled with a discharge conduit—equally not shown—e.g. in the form of a tube etc. In operation, the coolant flows through the pump housing 2 from the flow inlet opening 21 in the direction towards the flow outlet opening 23. Pump wheel assembly 3, electric motor 4, and electronic control unit 5 are consecutively arranged in the direction of flow of the coolant within the pump housing 2 in accordance with the representation in FIG. 1.

The pump wheel assembly 3 includes a pump wheel 31 which is designed as an axial pump wheel and mounted on a shaft 32. The latter at first extends through a bearing support 33 coupled to the electric motor 4, and furthermore through the electric motor 4 proper as far as the end thereof facing the electronic control unit 5. The bearing support 33 is here bolted to the casing of the electric motor 4, with the bolt holes being filled in the shown manner so as to avoid eddies in the coolant flow.

The pump wheel 31 has an external diameter substantially corresponding to the internal diameter of the flow inlet opening 21 or to the internal diameter of an annular portion 34 of the bearing support 33, respectively, so that the pump wheel 31 may be moved rotatingly with small play within the flow inlet opening 21 and in the annular portion 34, respectively. In the present example, the flow inlet opening 21 has a diameter of 25 mm. This measure also substantially corresponds to the internal diameter of the supply conduit tube not represented here.

The shaft 32 is mounted in the vicinity of the pump wheel 31 in a slide bearing section or slide bearing 35, respectively, at the bearing support 33. The slide bearing 35 may be formed of a carbon fiber material such as, e.g., PEEK. Between the slide bearing 35 and the entry of the shaft 32 into the electric motor 4 there is moreover arranged a shaft seal ring 36, whereby the interior space of the electric motor 4 is encapsulated against the coolant. In the present embodiment, the shaft seal ring 36 has the form of a double diaphragm seal having a grease-packed interstice. At the end of the shaft 32 removed from the pump wheel 31, a rolling bearing 37 is moreover arranged within the electric motor 4, which here has the form of a deep groove ball bearing.

The electric motor 4 and the electronic control unit 5 coupled to it are moreover retained in the pump housing 2 with the aid of three webs uniformly distributed over the circumference and not represented in detail here. The webs are formed of an elastomer. As is indicated in FIG. 1, the pump housing 2 moreover includes an opening 24 communicating with the atmosphere, whereby the rotor cavity of the electric motor 4 is ventilated. In the wall of the pump housing 2, there are moreover arranged supply pins 6 allowing for driving the electronic control unit 5. The number of supply pins 6 will depend on the type of the electronic control unit 5.

The electric motor 4 here has the form of a brushless DC motor with electronic commutation. It is encapsulated against the coolant flowing around it and thus runs dry.

The cross-sectional area of the flow inlet opening 21 in relation to the effective area of flow in the annular flow passage between the electric motor 4 and the inner wall of the pump housing 2 in the center portion 22, as well as in relation to the effective cross-sectional area of the flow outlet opening 23 is adapted such that friction losses are avoided. The flow outlet opening 23 generally has the same diameter as the flow inlet opening 21, however this is not mandatory.

In operation, the electric motor 4 is driven by the electronic control unit 5 so as to provide the desired rotational speed or the desired torque, respectively, in order for the pump wheel 31 to achieve the desired coolant flow rate. Herein the coolant is drawn in through the flow inlet opening 21, conveyed on by the pump wheel 31, and flows across the range of the gap between the outer periphery of the electric motor 4 and of the electronic control unit 5, respectively, and the internal diameter of the pump housing 2, whereby these components are cooled at the same time. The coolant is finally discharged through the flow outlet opening 23 and supplied to the internal combustion engine.

The invention allows for other design approaches besides the explained embodiment.

Thus instead of the axial pump wheel, a semiaxial pump wheel may also be employed.

Moreover the internal diameter of the flow inlet opening 21, just like that of the annular flow passage around the electric motor 4 and the diameter of the flow outlet opening 23, may be varied in accordance with the respective circumstances.

The shaft seal ring may equally be arranged between slide bearing 35 and pump wheel 31, so that the slide bearing 35 also is dry. The shaft seal ring may be substituted with other seal means. Here it is also possible to employ a rolling bearing instead of a slide bearing. In accordance with the invention, however, the diameters of the bearings and of the shaft seal ring also are to be kept small so as to minimize friction losses.

The electronic control unit may also include a metallic support member whereby the waste heat of the electronic components is better passed on to the coolant.

The coolant pump 1 in accordance with the invention may in addition also be used for applications other than for an internal combustion engine. Thus, e.g., utilization in the case of fuel cell drives etc. is also possible.

The coolant pump 1 may moreover be arranged in just about any location inside the coolant circuit, so that restrictions with regard to the installation locations hardly exist. Here it is, for example, also possible to arrange the coolant pump inside another component in an engine room such as, e.g., inside an oil sump, as long as it is possible to attach the corresponding connections for the coolant circuit.

The invention thus furnishes an electrically powered coolant pump 1 which is suited particularly for an internal combustion engine and wherein a coolant, in particular a water-based one, is guided along the surfaces to be cooled in a closed cooling circuit. Herein the coolant pump 1 comprises a pump housing 2 having an elongate shape which encloses a pump wheel 31 on the inlet side and subsequently downstream therefrom encloses an electric motor 4, with an annular flow passage for the coolant being formed between the pump housing 2 and the outside of the electric motor 4. The electric motor 4 is encapsulated against the coolant, and the structural component of electric motor and pump wheel is retained in the axial range of the electric motor 4 with the aid of at least one web in the pump housing 2 through which moreover the connections 6 for the electric motor 4 are routed. Thanks to the permanent cooling of the electric motor obtained with the aid of the coolant flowing by, the coolant pump 1 may therefore be operated at very high rotational speeds, so that a small structural size and at the same time a low weight of the assembly may be realized. Widely varying installation locations for the coolant pump 1 of the invention are therefore possible.

What is claimed is:

1. An electrically powered coolant pump (1) for a cooling water circuit of an internal combustion engine in an automotive vehicle, wherein a liquid coolant, in particular a water-based one, is guided in a closed cooling circuit along the surfaces to be cooled, including an electric motor (4) and a rotational pump wheel (31) driven by said electric motor (4) for introducing kinetic energy into the liquid coolant, wherein said pump wheel (31) is an axial pump wheel and is arranged in a pump housing (2) having a flow inlet opening (21) and a flow outlet opening (23), and wherein the coolant moreover serves for cooling said electric motor (4), wherein said pump housing (2) has an elongate shape and on the inlet side encloses said pump wheel (31) and subsequently downstream therefrom encloses said electric motor (4), between said pump housing (2) and the outside of said electric motor (4) an essentially annular flow passage for the coolant is arranged, said electric motor (4) is encapsulated against the coolant and runs dry at rotational speeds of more than 12,000 rpm, and the structural component of electric motor and pump wheel is retained in the axial range of said electric motor (4) with the aid of at least one web in said pump housing (2), through which web moreover the connections (6) for driving said electric motor (4) are routed.

2. The coolant pump in accordance with claim 1, characterized in that said electric motor (4) is followed by an electronic control unit (5) in the direction of flow.

3. The coolant pump in accordance with claim 2, characterized in that said electronic control unit (5) includes a metallic support member.

4. The coolant pump in accordance with any one of claim 1, characterized in that the external diameter of said pump wheel (31) substantially corresponds to the internal diameter of a supply conduit to said pump housing (2).

5. The coolant pump in accordance with claim 4, characterized in that the cross-sectional area of flow of the annular flow passage around said electric motor (4) is adapted to the cross-sectional area of opening of said flow inlet opening (21).

6. The coolant pump in accordance with any one of claims 1 to 5, characterized in that a first bearing of a shaft (32) supporting said pump wheel (31) is arranged in the vicinity of said pump wheel (31).

7. The coolant pump in accordance with claim 6, characterized in that said first bearing has the form of a slide bearing (35).

8. The coolant pump in accordance with claim 6, characterized in that said first bearing has the form of a rolling bearing.

9. The coolant pump in accordance with any one of claims 1 to 8, characterized in that a second bearing of a shaft (32) supporting said pump wheel (31) is arranged at said electric motor (4).

10. The coolant pump in accordance with claim 9, characterized in that said second bearing has the form of a rolling bearing (37), in particular a deep groove ball bearing for receiving axial forces, and is encapsulated against the coolant.

11. The coolant pump in accordance with claim 9 or 10, characterized in that said second bearing is encapsulated against the coolant by means of a shaft seal ring (36).

12. The coolant pump in accordance with claim 11, characterized in that said shaft is formed in two parts and comprises a corrosion-proof needle pin as well as a shaft portion, wherein said needle pin serves as a sliding partner for said shaft seal ring (36) and is press-fitted into said shaft portion, and wherein said the needle pin consists of a material that has a higher hardness than the material of said shaft portion.

13. The coolant pump in accordance with any one of claims 1 to 12, characterized in that said at least one web is formed of an elastomer synthetic material.

14. The coolant pump in accordance with any one of claims 1 to 13, characterized in that the structural component of electric motor and pump wheel is retained in said pump housing (2) with the aid of a plurality of webs distributed over the circumference.

15. The coolant pump in accordance with claim 1, characterized in that said pump wheel (31) is formed of a flexible and impact resistant synthetic material.

16. The coolant pump in accordance with any one of claims 4 to 15, characterized in that the supply conduit to said pump housing (2) which encloses said pump wheel (31) is formed of a synthetic material which is capable of embedding particles to thus prevent blocking of said pump wheel (31).

17. The coolant pump in accordance with claim 15, characterized in that said flexible and impact resistant synthetic material comprises polyetheretherketone (PEEK).

* * * * *

UNITED STATES PATENT AND TRADEMARK OFFICE
CERTIFICATE OF CORRECTION

PATENT NO.         : 6,612,815 B2  
APPLICATION NO. : 09/947924  
DATED                : September 2, 2003  
INVENTOR(S)       : Pawellek et al.

Page 1 of 1

It is certified that error appears in the above-identified patent and that said Letters Patent is hereby corrected as shown below:

Column 7, line 20, delete "any one of".

Column 7, lines 29-30, change "any one of claims 1 to 5" to -- claim 1 --.

Column 7, lines 39-40, change "any one of claims 1 to 8" to -- claim 1 --.

Column 8, line 6, delete "or 10".

Column 8, lines 17-18, change "any one of claims 1 to 12" to -- claim 1 --.

Column 8, lines 20-21, change "any one of claims 1 to 13" to -- claim 1 --.

Column 8, lines 28-29, change "any one of claims 4 to 15" to -- claim 4 --.

Signed and Sealed this

Fifth Day of June, 2007

JON W. DUDAS  
*Director of the United States Patent and Trademark Office*